United States Patent
Aranzulla et al.

(10) Patent No.: US 10,384,635 B2
(45) Date of Patent: Aug. 20, 2019

(54) FRONT AIRBAG

(71) Applicant: TRW AUTOMOTIVE GMBH, Alfdorf (DE)

(72) Inventors: Daniele Aranzulla, Essingen (DE); Martin Burkhardtsmaier, Schwäbisch Gmünd (DE); Lisa Stegmaier, Schwäbisch Gmünd (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 0 days.

(21) Appl. No.: 15/524,013

(22) PCT Filed: Oct. 29, 2015

(86) PCT No.: PCT/EP2015/002147
§ 371 (c)(1),
(2) Date: May 3, 2017

(87) PCT Pub. No.: WO2016/070976
PCT Pub. Date: May 12, 2016

(65) Prior Publication Data
US 2017/0369023 A1 Dec. 28, 2017

(30) Foreign Application Priority Data
Nov. 4, 2014 (DE) .......... 10 2014 016 163

(51) Int. Cl.
*B60R 21/00* (2006.01)
*B60R 21/205* (2011.01)
(Continued)

(52) U.S. Cl.
CPC .......... *B60R 21/231* (2013.01); *B60R 21/205* (2013.01); *B60R 2021/0048* (2013.01); *B60R 2021/23571* (2013.01)

(58) Field of Classification Search
CPC ............... B60R 21/231; B60R 2021/23571
(Continued)

(56) References Cited

U.S. PATENT DOCUMENTS 6,299,206 B1 * 10/2001 Keshavaraj ........... B60R 21/231
280/729
7,073,818 B2 * 7/2006 Hasebe ................. B60R 21/233
280/729
(Continued)

FOREIGN PATENT DOCUMENTS

DE 102015111873 A1 * 1/2017 .......... B60R 21/205
EP 1452403 9/2004
(Continued)

OTHER PUBLICATIONS

Translation of JP2013112014A cited on PTO-892, Paper No. 20180505 (Year: 2013).*

*Primary Examiner* — Faye M Fleming
(74) *Attorney, Agent, or Firm* — Tarolli, Sundheim, Covell & Tummino LLP

(57) ABSTRACT

A front airbag comprises a front wall (20) facing an associated occupant in the inflated state which front wall serves for cushioning the vehicle occupant and is secured to a peripheral wall of the front airbag (12). The front wall (20) is composed of at least two cut parts (28a, 28b) so that it is curved toward the vehicle occupant and is not adapted to be flatly spread.

15 Claims, 5 Drawing Sheets

(51) Int. Cl.
*B60R 21/231* (2011.01)
*B60R 21/235* (2006.01)

(58) Field of Classification Search
USPC ........................................................ 280/743.1
See application file for complete search history.

(56) References Cited

U.S. PATENT DOCUMENTS

| | | | | |
|---|---|---|---|---|
| 7,461,861 | B2* | 12/2008 | Keshavaraj | B60R 21/233 |
| | | | | 280/743.1 |
| 8,651,523 | B2* | 2/2014 | Miyata | B60R 21/205 |
| | | | | 280/729 |
| 2006/0131859 | A1* | 6/2006 | Kumagai | B60R 21/164 |
| | | | | 280/743.1 |
| 2010/0116186 | A1* | 5/2010 | Kumagai | B60R 21/233 |
| | | | | 112/475.08 |
| 2010/0156076 | A1* | 6/2010 | Miyata | B60R 21/233 |
| | | | | 280/743.1 |
| 2010/0156078 | A1* | 6/2010 | Miyata | B60R 21/231 |
| | | | | 280/743.2 |
| 2011/0025024 | A1* | 2/2011 | Choi | B60R 21/233 |
| | | | | 280/728.2 |
| 2012/0098242 | A1 | 4/2012 | Aranzulla et al. | |
| 2013/0285350 | A1 | 10/2013 | Fischer et al. | |
| 2017/0210326 | A1* | 7/2017 | Miura | B60R 21/205 |
| 2017/0355344 | A1* | 12/2017 | Choi | B60R 21/231 |

FOREIGN PATENT DOCUMENTS

| | | | | | |
|---|---|---|---|---|---|
| JP | 2010241295 | A | * | 10/2010 | B60R 21/231 |
| JP | 2013112014 | A | * | 6/2013 | B60R 21/231 |
| JP | 2017065396 | A | * | 4/2017 | B60R 21/231 |

* cited by examiner

FRONT AIRBAG

RELATED APPLICATIONS

This application corresponds to PCT/EP2015/002147, filed Oct. 29, 2015, which claims the benefit of German Application No. 10 2014 016 163.3, filed Nov. 4, 2014, the subject matter of which are incorporated herein by reference in their entirety.

BACKGROUND OF THE INVENTION

The invention relates to a front airbag for a vehicle occupant protection system.

Front airbags are primarily mounted in the instrument panel in the area of the front passenger seat. In a known design the airbag includes a front wall facing the associated occupant in the inflated state which forms a baffle for cushioning the vehicle occupant. Said front wall extends obliquely with respect to the vertical direction so that the vehicle occupant can immerse into the airbag with the upper body part and the head in a relatively optimum manner.

In the case of a conventional airbag the front wall is connected along its peripheral edge to a bag-shaped peripheral wall which on a backside faced away from the front wall includes an inflation mouth through which the airbag is filled and which also facilitates securing to the instrument panel. Such airbags take a three-dimensional shape already in the non-inflated state, i.e. the non-inflated but completely joined airbag cannot be laid two-dimensionally so that all cut parts of the airbag are at the same time spread flatly, i.e. free from creases. The advantage of said designs resides in the fact that in this way a large filling volume and thus proper cushioning quality for the vehicle occupant can be achieved.

SUMMARY OF THE INVENTION

It is the object of the invention to optimize cushioning of the vehicle occupants by an airbag.

This is achieved in a front airbag comprising a front wall facing an associated occupant in the inflated state, which front wall serves for cushioning the vehicle occupant and is secured to a peripheral wall of the airbag, wherein the front wall is composed of at least two cut parts so that it is curved toward the vehicle occupant and cannot be spread flatly and thus free from creases. In this way, the shape of the front wall and the volume of the airbag can be specifically influenced in the area of the front wall in a simple manner. According to the invention, the volume of the airbag is increased in the area of the front wall, which permits the vehicle occupant to immerse more softly. In contrast to the conventional airbag shape, the front wall is not designed as an area two-dimensional in the non-inflated state, but already by the connection of the cut parts a three-dimensional shape is imparted to the front wall.

In a possible embodiment, the front wall is composed of exactly two cut parts, which enables variable adaptation of the shape of the front wall without excessively increasing the manufacturing effort. The composed front wall substantially takes the shape of a lens.

In another possible embodiment, the front wall is composed of exactly three cut parts. Of course, it is also possible to make use of an even larger number of cut parts, which also renders manufacture more complicated, however.

Each of the individual cut parts consists of one single piece of a suited airbag material, for example a coated fabric. The individual cut parts can be selected as to their shape so that the surface area thereof is not subdivided by notches. Preferably, they do not include any darts, either.

In order to obtain the increase in volume in a simple manner preferably at least at one cut part an inner edge by which the cut part is attached to an adjacent cut part of the front wall is formed at least in portions so that in the spread not sewn-up state it does not extend in a straight line.

The inner edge may define, especially in the area of its central portion, a bulge of the associated cut part by which the volume increase of the airbag is achieved in the area of the front wall. The bulge can have, measured in the inflated state, for example a height of approx. 30 to 70 mm, preferably at least 50 mm, so as to create a sufficient additional volume.

The bulge extends, for example, perpendicularly to a straight line across the intersections of the inner edge of the cut part with the peripheral edge of the cut part (which is also part of the peripheral edge of the entire front wall), wherein the maximum distance of the inner edge from the straight line preferably amounts to at least 50 mm.

The cut parts forming the front wall can be interconnected, according to a variant, when being flatly spread, when the inner edge of two adjacent cut parts extends inversely so that the inner edges of the two cut parts can be flatly superimposed for sewing.

It is also possible to design the inner edge of two cut parts inversely and to secure each of said two cut parts to one or more interposed cut parts the inner edges of which may also have a different contour.

A central cut part of the front wall can have inner edges extending in a straight and especially parallel manner, for example, at which it is connected to other cut parts of the front wall. In this way, the curvature of the front wall can be easily adjusted to a desired measure. The central cut part e.g. takes the shape of a tape.

Preferably, the front wall is designed to be mirror-inverted with respect to an imaginary center line which extends from a highest point of the front wall in the mounted and inflated state of the front airbag to a deepest point of the front wall.

In a possible embodiment, the front wall is subdivided transversely to said imaginary center line into the individual cut parts, wherein especially each straight line extends across the intersections of the inner edge of the cut part with the peripheral edge of the cut part perpendicularly to the center line (in view of the front wall in the inflated state). The individual cut parts are adjacent to each other along the center line.

In a different embodiment, the front wall is subdivided along the center line into the individual cut parts, wherein especially a straight line extends across the intersections of the inner edge of the respective cut part with the peripheral edge of the cut part in parallel to the center line (equally in view of the front wall in the inflated state). In this case, the individual cut parts are adjacent to each other transversely to the center line.

Of course, the front wall may also be designed to be not mirror-inverted. Especially, in this case in the individual cut parts the straight lines across the intersections of the inner edge with the peripheral edge can also extend obliquely with respect to the center line. A division which is non-parallel and, resp., perpendicular to the center line may also be favorable to produce specific shapes of the front face.

The peripheral wall of the airbag connected to the front wall may consist of one or more cut parts. The cut parts of the peripheral wall form no cushioning surface and, where possible, do not get into contact with the vehicle occupant.

For reducing the waste and for facilitating the connection of the cut parts the peripheral wall may consist of two cut parts which in total connect the front wall to an inflation mouth of the airbag. The entire front airbag may be substantially composed, except for reinforcing layers and the like, of two cut parts forming the peripheral wall as well as of two or three cut parts forming the front wall.

The peripheral wall may have a bag-shaped geometry when the airbag is inflated.

The front wall in total has a contour outwardly curved toward the occupant which has no drawing-ins or inward constrictions.

BRIEF DESCRIPTION OF THE DRAWINGS

The invention will be described hereinafter in detail by way of several embodiments with reference to the enclosed drawings, wherein.

DESCRIPTION

Figure 1:
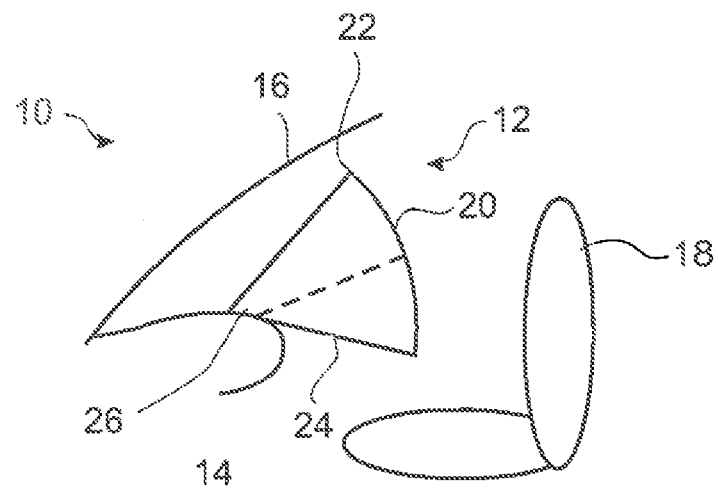
FIG. 1 shows a schematic representation of a vehicle occupant protection system comprising a front airbag according to the invention.

FIG. 1 illustrates a vehicle occupant protection system 10 in a passenger car not shown in detail.

A front airbag 12 is arranged on an instrument panel 14 so that it deploys between a windscreen 16 and a vehicle seat 18 so as to offer protection for a passenger. In the schematically shown inflated state a front wall 20 serving as a baffle faces the vehicle occupant.

The front wall 20 is connected to a peripheral wall 24 of the front airbag 12 along its peripheral edge 22. The peripheral edge 24 is designed to be approximately bag-shaped and has a rear inflation mouth 26 through which the filling gas can flow into the front airbag 12. In the area of the inflation mouth 26 the front airbag 12 is fixed to the instrument panel 14. Prior to its deployment, the front airbag 12 is accommodated in a folded state in a suited space in the instrument panel 14.

Figure 3:
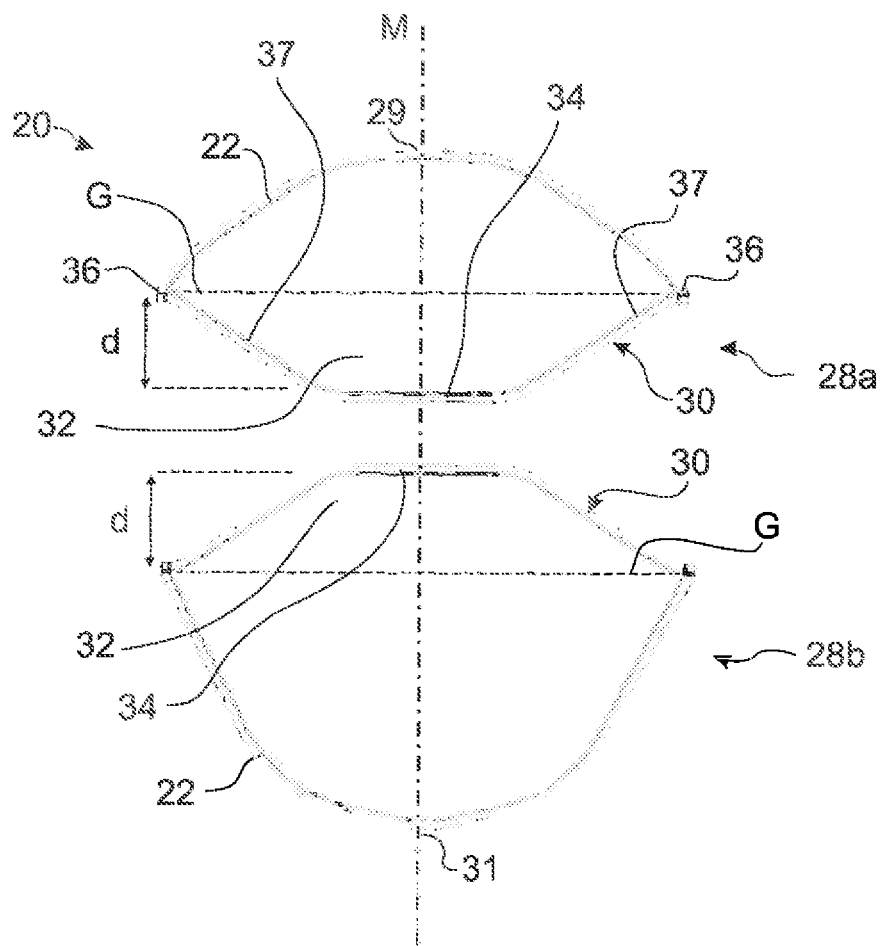
FIG. 3 shows a schematic representation of the cut parts of the front wall of a front airbag according to the invention in accordance with a first embodiment.

The front wall 20 of the front airbag 12 is composed in a first embodiment shown in FIG. 3 of exactly two cut parts 28a, 28b. The edge of each of the cut parts 28a, 28b is composed of a segment of the peripheral edge 22 of the later front wall 20 as well as an inner edge 30 by which it is connected to an adjacent cut part of the front wall 20.

The connection of the cut parts 28, 28b of the front airbag 12 to each other may be performed by sewing, gluing, welding or in any other suited way.

Figure 2:
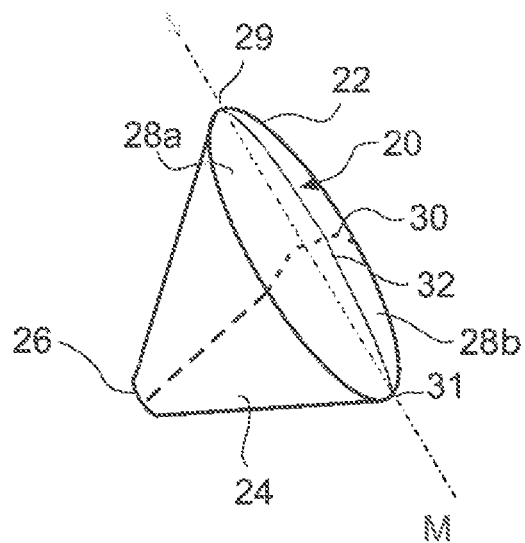
FIG. 2 shows a schematic perspective representation of a front airbag according to the invention.

In the embodiment shown in FIG. 3, the entire front wall 20 is designed inversely with respect to a center line M. Moreover, each individual one of the cut parts 28a, 28b is designed to be mirror-inverted with respect to the center line M. The center line M extends from a highest point 29 in the mounted and deployed state of the front airbag 12 to a deepest point 31 of the front wall 20, as indicated in FIG. 2.

Both inner edges 30 of the cut parts 28a, 28b in this case do not extend along a straight line. The inner edge 30 is designed in each case so that it defines a bulge 32 around which a central portion 34 of the inner edge 30 projects vis-à-vis an imaginary straight line G across the intersections 36 of the inner edge 30 with the peripheral edge 22 of the cut part 28a, 28b. In this case, the distance d and thus the height of the bulge between the central portion 34 of the inner edge 30 and the straight line G amounts to about 30 to 70 mm, especially more than 50 mm, however.

The course of the inner edge 30 is selected so that the latter is composed of three substantially straight portions, wherein the outer portions 37 extend obliquely with respect to the center line M and the central portion 34 extends perpendicularly to the center line M.

The bulges 32 are designed inversely in both cut parts 28a, 28b. This allows to superimpose the cut parts 28a, 28b, when connecting them, along the bulges 32 up to the intersections 36 and to connect them at the edge, when the cut parts are flatly spread.

In this way, a front wall 20 is formed having a closed peripheral edge 22 which cannot be flatly spread as the bulges 32 of the two cut parts 28a, 28b result in an outwardly directed curvature which enlarges the volume in the area of the front wall 12. This is indicated in FIG. 2.

The two cut parts 28a, 28b otherwise are not symmetrically designed. Here the cut part 28a forming the upper portion of the front wall is smaller than the cut part 28b forming the lower portion of the front wall 20. In total, the front wall 20 is approximately egg-shaped in a top view, wherein the upper cut part 28a in the area of the highest point 29 has a curvature larger than that of the lower cut part 28b in the lowest point 31. Due to the geometry of the cut parts 28a, 28b, the bulge 32 in the finished front wall 20 is closer to the highest point 29 of the front wall 20 than to the lowest point 31. The highest and lowest points 29, 31 relate to the mounted inflated airbag.

By the shape of the individual cut parts 28a, 28b and the course of the inner edges 30 thereof those skilled in the art can specifically predetermine the shape of the front airbag 12 and the areas having an enlarged volume along the front wall 20 depending on the circumstances.

The peripheral wall 24 of the front airbag 12 in this case is composed of two cut parts each of which is mirror-inverted with respect to the center line M (not shown in detail).

For fabricating the front airbag 12, at first all cut parts are cut out of a suited fabric, for example. The cut parts 28a, 28b of the front wall 20 are interconnected along the inner edges 30. Subsequently, the front wall 20 is connected to the peripheral wall 24 along the peripheral edge 22.

Figure 4:
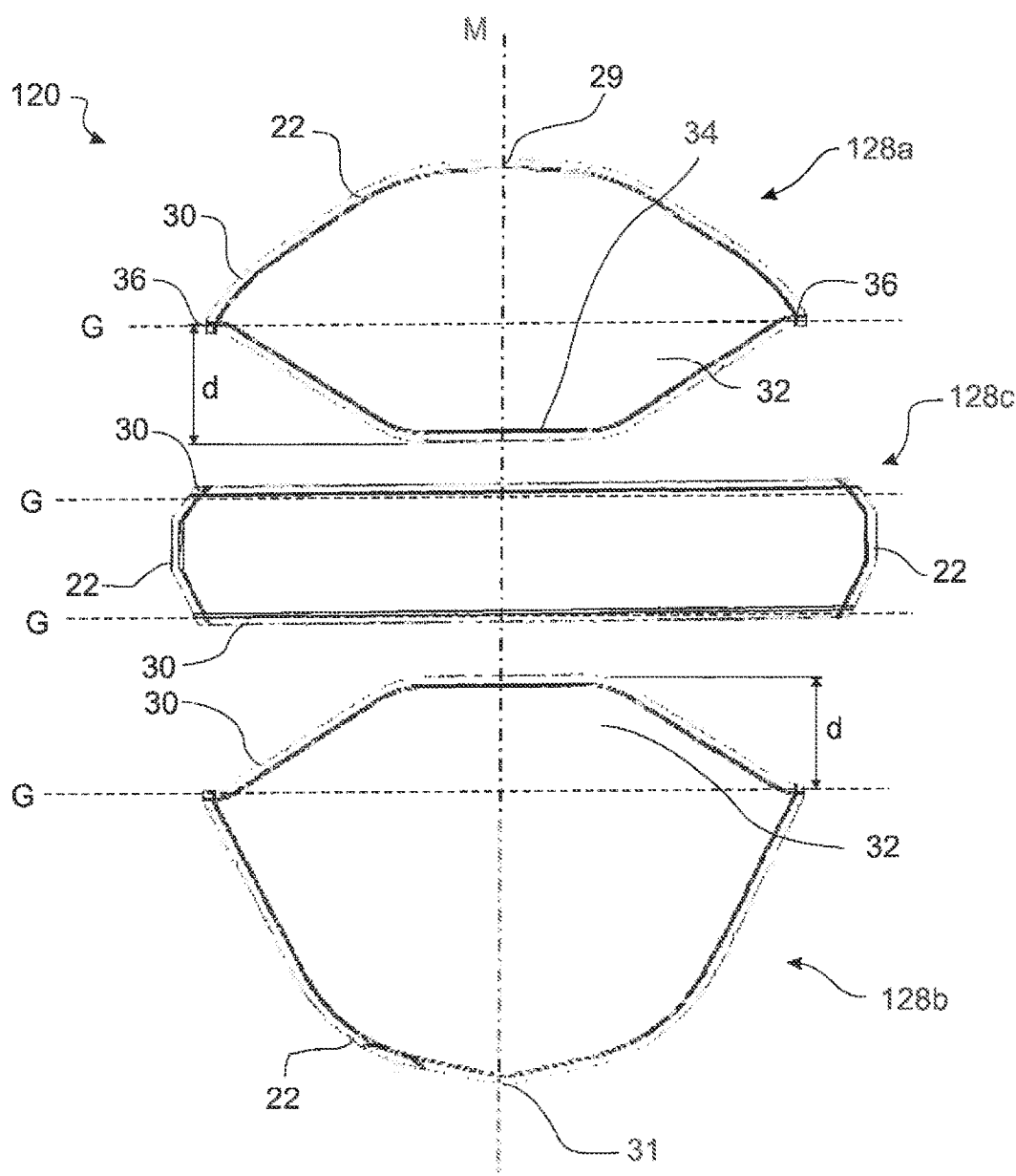
FIG. 4 shows a schematic representation of the cut parts of the front wall of a front airbag according to the invention in accordance with a second embodiment.

FIG. 4 illustrates a second embodiment in which the front wall 120 of the front airbag 12 is composed of three individual cut parts 128a, 128b and 128c.

As to its shape and size, the cut part 128a corresponds to the cut part 28a and the cut part 128b corresponds to the cut part 28b of the first embodiment.

The tape-shaped cut part 128c is inserted between the cut parts 128a and 128b, wherein an inner edge 30 of the central cut part 128c is connected to the inner edge 30 of the cut part 28a and the other inner edge 30 is connected to the inner edge 30 of the cut part 128b. The central cut part 128c in this case has straight inner edges 30 extending in parallel to each other. At the central cut part 128c no bulge is provided in this case, but each of the inner edges 30 substantially extends along the straight line G between the intersections 36 of the inner edges 30 and the peripheral edge 22 of the cut part 128c.

Each of the two peripheral edge portions 22 of the central cut part 128c extends in a curve and is composed of three straight portions adjacent to each other in an angular shape, wherein here the central one of the portions extends in parallel to the center line M. The cut part 128c, too, is mirror-inverted relative to the center line M.

The use of a central cut part having straight inner edges 30 provides for a flattening of the curvature of the front wall 120 in the area of the central cut part 128c.

As already in the first embodiment, all peripheral edges 22 of the individual cut parts 128a, 128b, 128c complement each other to form the complete peripheral edge 22 of the front wall 20.

The maximum extension d of the bulge 32 may be equal to the just described embodiment of FIG. 3.

Figure 5:
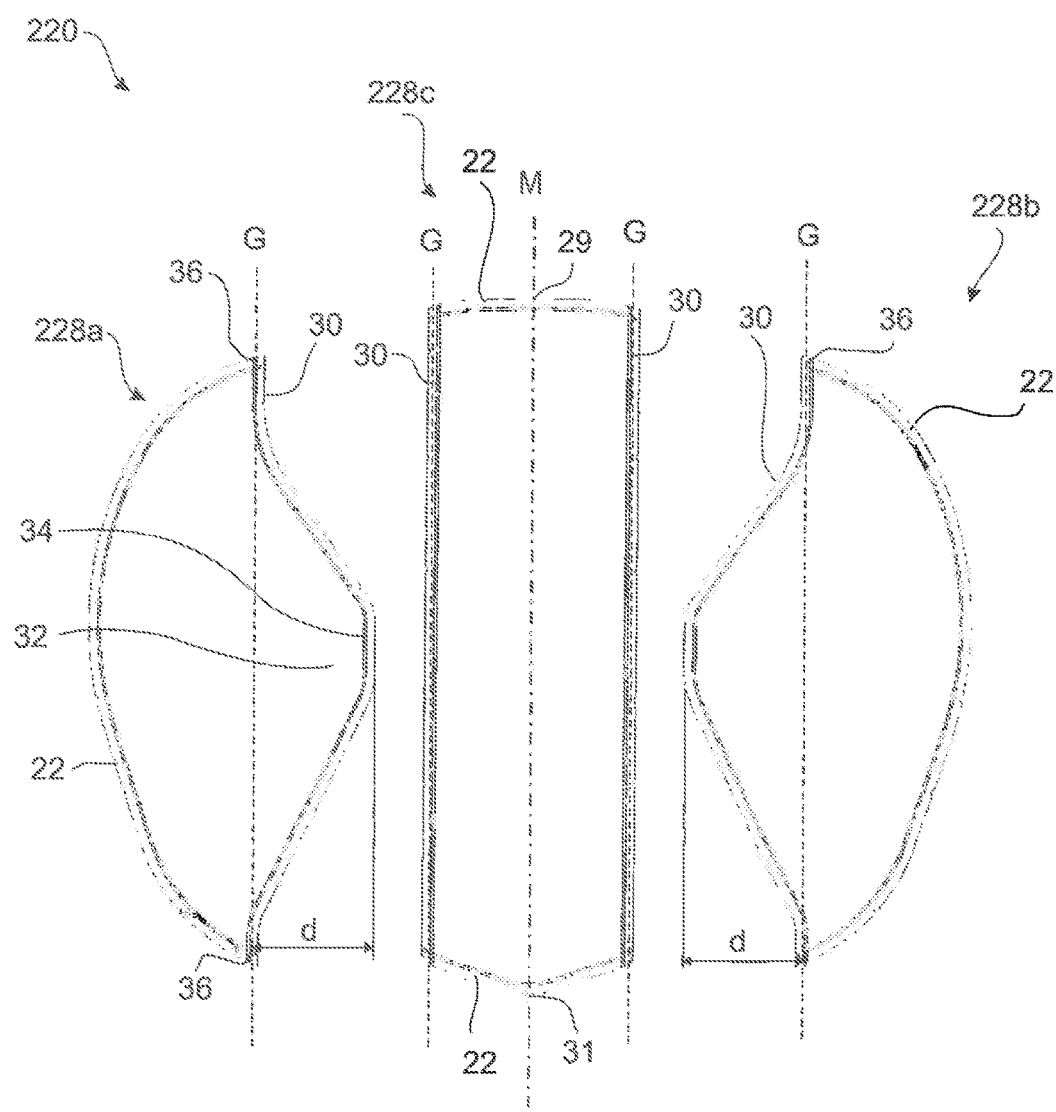
FIG. 5 shows a schematic representation of the cut parts of the front wall of a front airbag according to the invention in accordance with a third embodiment.

FIG. 5 illustrates a third embodiment of a front wall 220 for the front airbag 12. In this case, the front wall 220 is composed, as in the just described embodiment, of three separate cut parts 228a, 228b and 228c.

The front wall 220 in this case is subdivided along the center line M, however, and not transversely thereto, as in the previous embodiments. The straight lines G across the intersections 36 between the respective inner edge 30 and the peripheral edge or edges 22 of a cut part 228a, 228b, 228c extend in parallel to the center line M and not, as just described, perpendicularly thereto. Of course, also designs would be imaginable in which the straight lines G are aligned at an angle other than 0 or 90° with respect to the center line M.

Otherwise, the structure of the front wall 220 is similar to the just described front wall 120. Each of the two outer cut parts 228a, 228b has an inner edge 30 not extending in a straight line and is inversely shaped. The inner edge 30 forms a bulge 32 vis-à-vis the straight line G of the respective cut part, wherein the maximum extension d of the bulge 32 in its central portion 34 contributes, as in the other embodiments, to e.g. about 30 to 70, especially more than 50 mm, however.

The inner edges of the central cut parts 228c extend straightly and extend in parallel to the center line M in this case.

Therefore, in the finished front wall 220 the central cut part 228c is located along the center of the inflated front airbag 12 as a seamless strip.

In this embodiment, the bulge 32 along the center line M is placed approximately at half the height of the front airbag 12 between the highest point 29 and the deepest point 31 of the front wall 220.

Figure 6:
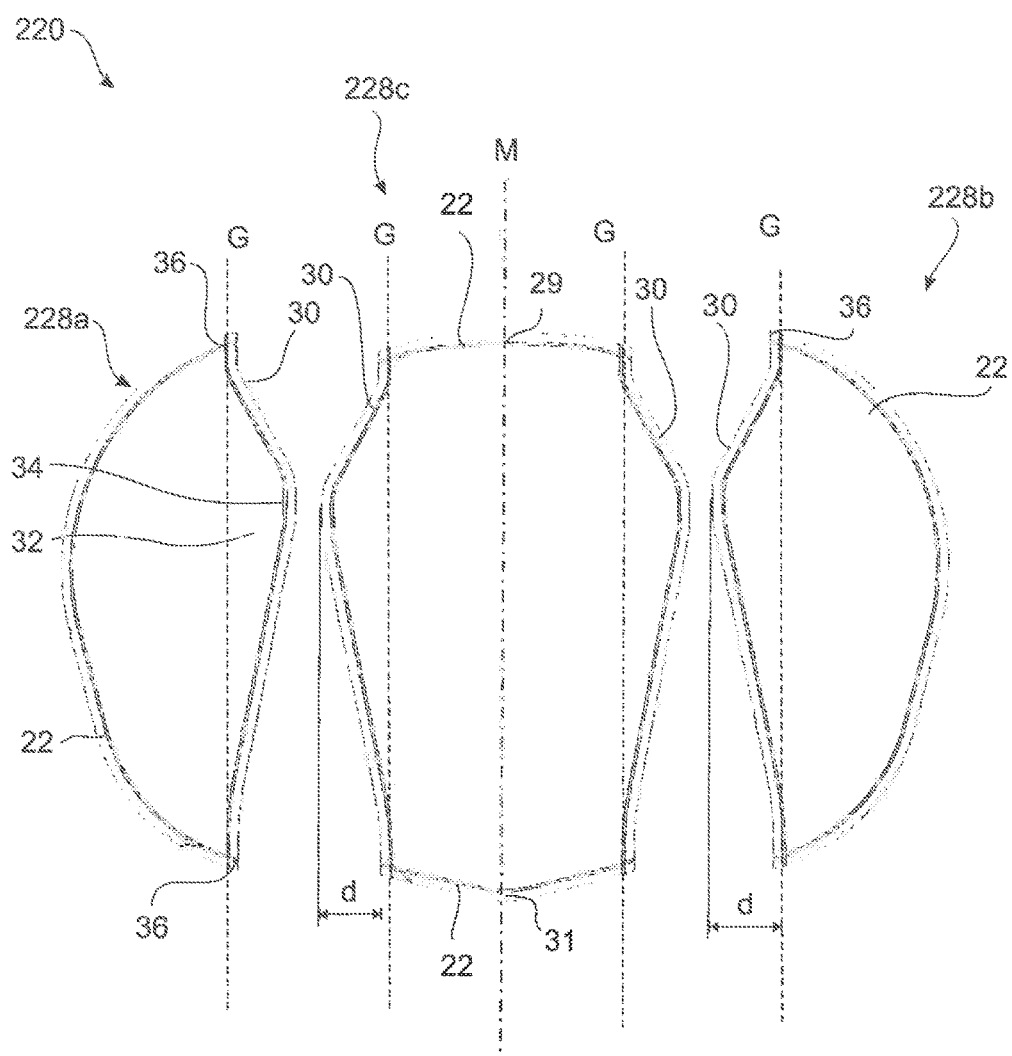
FIG. 6 shows a schematic representation of the cut parts of a front wall of a front airbag according to the invention in accordance with a fourth embodiment.

The fourth embodiment shown in FIG. 6 of a front wall 320 for a front airbag 12 equally includes three separate cut parts 328a, 328b, 328c, wherein the central cut part 328c is located between the two outer cut parts 128a, 128b.

As in the just described embodiment, the cut parts 328a, 328b, 328c are adjacent to each other transversely to the center line M.

In this example, however, the inner edges 30 of the central cut part 328c are not designed to be straight but each has a mirror-image course with respect to the inner edge 30 of the respective adjacent cut part 328a, 328b.

In the variant shown here, the front wall 20 therefore has a continuous seamless and evenly curved central area, while nevertheless comfortable two-dimensional connection of the cut parts 328a, 328c and 328b, 328c of the front wall 320 is given. For this purpose, each of the inner edges 30 of neighboring cut parts 328a, 328c and 328b, 328c are flatly superimposed and are interconnected, which is possible due to the mirror-inverted shape of the cut parts 328a, 328b, 328c in the area of their inner edges 30.

The bulges 32 of the inner edges 30 are offset in the direction of the highest point 29 of the front face 320. This provides for an increased volume of the front wall 320 in the upper area.

The peripheral edges 22 of all three cut parts 328a, 328b, 328c complement each other, as in the other embodiments, to form the entire peripheral edge 22 of the front wall 320.

All features of the described embodiments can also be individually realized, can be exchanged for each other or can be freely combined with each other at the discretion of those skilled in the art.

It is also possible, of course, to arrange three cut parts along the center line M next to each other, as for example in the embodiment shown in FIG. 4, and to provide the central cut part 128c there equally with inner edges 30 which do not straightly extend and which extend inversely to the inner edges 30 of the respective adjacent cut parts 128a, 128b. It is equally imaginable to compose the front wall of two cut parts which are adjacent to each other transversely to the center line M.

The invention claimed is:

1. A front airbag comprising a front wall (20; 120; 220; 320) facing an associated occupant in the inflated state which serves for cushioning the vehicle occupant and which is secured to a peripheral wall (24) of the front airbag (12), wherein the front wall (20; 120; 220; 320) is composed of at least two cut parts (28a, 28b; 128a, 128b, 128c; 228a, 228b, 228c; 328a, 328b, 328c) so that it is curved toward the vehicle occupant such that the volume of the airbag is increased in the area of the front wall and is not adapted to be flatly spread, the front wall of the inflated airbag having a contour outwardly curved toward the vehicle occupant and being free from drawing-ins and/or inward constrictions.

2. The front airbag according to claim 1, wherein the front wall (20) is composed of exactly two cut parts (28a, 28b).

3. The front airbag according to claim 1, wherein the front wall (120; 220; 320) is composed of exactly three cut parts (128a, 128b, 128c; 228a, 228b, 228c; 328a, 328b, 328c).

4. The front airbag according to claim 1, wherein an inner edge (30) of at least one of the cut parts (28a, 28b; 128a, 128b; 228a, 228c; 328a, 328b, 328c) by which the cut part (28a, 28b; 128a, 128b; 228a, 228c; 328a, 328c) is attached to an adjacent cut part (28a, 28b; 128a, 128b, 128b; 228a, 228b, 228c; 328a, 328b, 328c) of the front wall (20; 120; 220; 320) does not extend in a straight line at least in portions.

5. The front airbag according to claim 4, wherein the inner edge (30) defines a bulge (32) of the dedicated cut part (28a, 28b; 128a, 128b; 228a, 228c; 328a, 328b, 328c) in the area of its central portion (34) and especially in that the bulge (32) has a height (d) of 30-70 mm related to the spread state of the cut part.

6. The front airbag according to claim 4, wherein the inner edge (30) of two cut parts (28a, 28b; 128a, 128b; 228a, 228c; 328a, 328b, 328c) extends inversely.

7. The front airbag according to claim 1, wherein a central cut part (128c, 228c) of the front wall (120; 220) includes straightly extending inner edges (30) at which it is connected to other cut parts (128a, 128b; 228a, 228b) of the front wall (120; 220).

8. The front airbag according to claim 7, wherein the inner edges (30) of the central cut part (128c, 228c) extend in parallel.

9. The front airbag according to claim 1, wherein the front wall (20; 120; 220; 320) is formed with respect to an imaginary center line (M) which extends from a highest point (29) of the front wall (20; 120; 220; 320) in the mounted and inflated state of the front airbag (12) to a deepest point (31) of the front wall (20; 120; 220; 320) in view of the front wall (20; 120; 220; 320) of the inflated airbag mirror-inverted to the center line (M).

10. A front airbag comprising a front wall (20; 120; 220; 320) facing an associated occupant in the inflated state which serves for cushioning the vehicle occupant and which is secured to a peripheral wall (24) of the front airbag (12), wherein the front wall (20; 120; 220; 320) is composed of at least two cut parts (28a, 28b; 128a, 128b, 128c; 228a, 228b, 228c; 328a, 328b, 328c) so that it is curved toward the vehicle occupant such that the volume of the airbag is increased in the area of the front wall and is not adapted to be flatly spread;
    wherein the front wall (20; 120; 220; 320) is formed with respect to an imaginary center line (M) which extends from a highest point (29) of the front wall (20; 120; 220; 320) in the mounted and inflated state of the front airbag (12) to a deepest point (31) of the front wall (20; 120; 220; 320) in view of the front wall (20; 120; 220; 320) of the inflated airbag mirror-inverted to the center line (M); and
    wherein the front wall (20; 120) is subdivided into the individual cut parts (28a, 28b, 128a, 128b, 128c) transversely to the center line (M)-in view of the front wall (20; 120) of the inflated airbag.

11. A front airbag comprising a front wall (20; 120; 220; 320) facing an associated occupant in the inflated state which serves for cushioning the vehicle occupant and which is secured to a peripheral wall (24) of the front airbag (12), wherein the front wall (20; 120; 220; 320) is composed of at least two cut parts (28a, 28b; 128a, 128b, 128c; 228a, 228b, 228c; 328a, 328b, 328c) so that it is curved toward the vehicle occupant such that the volume of the airbag is increased in the area of the front wall and is not adapted to be flatly spread;
    wherein the front wall (20; 120; 220; 320) is formed with respect to an imaginary center line (M) which extends from a highest point (29) of the front wall (20; 120; 220; 320) in the mounted and inflated state of the front airbag (12) to a deepest point (31) of the front wall (20; 120; 220; 320) in view of the front wall (20; 120; 220; 320) of the inflated airbag mirror-inverted to the center line (M); and
    wherein the front wall (220; 320) is subdivided along the center line (M) into the individual cut parts (228a, 228b, 228c; 328a, 328b, 328c) in view of the front wall (20; 120) of the inflated airbag.

12. The front airbag according to claim 1, wherein the peripheral wall (24) comprises one or more cut parts.

13. The front airbag according to claim 1, wherein the peripheral wall (24) comprises two cut parts which connect the front wall (20; 120; 220; 320) to a rear inflation mouth of the front airbag (12).

14. The front airbag according to claim 10, wherein a straight line (G) extends across intersections (36) of the inner edge (30) of each cut part (28a, 28b; 128a, 128b, 128c) with the peripheral edge (22) of the cut part (28a, 28b; 128a, 128b, 128c) perpendicularly to the center line (M), in view of the front wall (20; 120) of the inflated airbag.

15. The front airbag according to claim 10, wherein a straight line (G) extends across intersections (36) of the inner edge (30) of each cut part (228a, 228b, 228c; 328a, 328b, 328c) with the peripheral edge (22) of the cut part (228a, 228b, 228c; 328a, 328b, 328c) in parallel to the center line (M), in view of the front wall (20; 120) of the inflated airbag.

\* \* \* \* \*